(12) United States Patent
Campbell et al.

(10) Patent No.: US 11,305,722 B2
(45) Date of Patent: Apr. 19, 2022

(54) VEHICLE AIRBAG CONTROL SYSTEM

(71) Applicant: NISSAN NORTH AMERICA, INC., Franklin, TN (US)

(72) Inventors: Stephanie Campbell, Commerce Township, MI (US); Karla Polyakova, Kodiak, AK (US); Tyler Sauerwein, West Bloomfield, MI (US); Alisha Martin, Howell, MI (US)

(73) Assignee: NISSAN NORTH AMERICA, INC., Franklin, TN (US)

( * ) Notice: Subject to any disclaimer, the term of this patent is extended or adjusted under 35 U.S.C. 154(b) by 0 days.

(21) Appl. No.: 16/923,302

(22) Filed: Jul. 8, 2020

(65) Prior Publication Data
US 2022/0009442 A1   Jan. 13, 2022

(51) Int. Cl.
  *B60R 21/239*    (2006.01)
  *B60R 21/205*    (2011.01)
  *B60R 21/015*    (2006.01)

(52) U.S. Cl.
  CPC ...... *B60R 21/239* (2013.01); *B60R 21/01546* (2014.10); *B60R 21/205* (2013.01); *B60R 2021/2395* (2013.01)

(58) Field of Classification Search
  None
  See application file for complete search history.

(56) References Cited

U.S. PATENT DOCUMENTS 5,366,242 A * 11/1994 Faigle ............... B60R 21/276
                                                    280/736

FOREIGN PATENT DOCUMENTS

| DE | 102007015957 A1 | * 11/2007 | ....... B60R 21/01526 |
| DE | 102015106434 B4 | 12/2017 | |
| GB | 2315467 B | 2/1998 | |
| JP | 2008213519 A | * 9/2008 | |

* cited by examiner

*Primary Examiner* — Faye M Fleming
(74) *Attorney, Agent, or Firm* — Global IP Counselors, LLP

(57) ABSTRACT

A vehicle airbag control system includes an airbag module, a temperature detector and an electronic controller. The airbag module is for a vehicle. The airbag module has an airbag with a vent. The temperature detector configured to detect an ambient temperature of the vehicle. The electronic controller is programmed to control the airbag module between an active venting condition and a non-venting condition based on a detected result detected by the temperature detector. The vent is in an open state in the active venting condition. The vent is in a closed state in the non-venting condition.

18 Claims, 3 Drawing Sheets

VEHICLE AIRBAG CONTROL SYSTEM

BACKGROUND

Field of the Invention

The present invention generally relates to a vehicle airbag control system. More specifically, the present invention relates to a vehicle airbag control system that is controlled based on a vehicle's ambient temperature.

Background Information

A vehicle can include a variety of airbags as part of an occupant restraint system of the vehicle. The airbag is configured to absorb energy from an external impact and to control movement of one or more occupants inside of the vehicle. Vehicle airbags can be mounted in a variety of locations, such as inside a vehicle dashboard housing, from center consoles and or vehicle pillars. Additionally, airbags can be mounted to a vehicle roof structure to deploy from a position overhead of the vehicle seats. Further, airbags can be movable or rotatable to deploy at different positions depending on need or circumstances.

SUMMARY

In view of the state of the known technology, one aspect of the present disclosure is to provide a vehicle airbag control system comprising an airbag module, a temperature detector and an electronic controller. The airbag module is for a vehicle. The airbag module has an airbag with a vent. The temperature detector configured to detect an ambient temperature of the vehicle. The electronic controller is programmed to control the airbag module between an active venting condition and a non-venting condition based on a detected result detected by the temperature detector. The vent is in an open state in the active venting condition. The vent is in a closed state in the non-venting condition.

In view of the state of the known technology, another aspect of the present disclosure is to provide a vehicle airbag control system comprising an airbag module, a temperature detector and an electronic controller. The airbag module is for a vehicle. The airbag module has an airbag with a vent. The temperature detector is configured to detect an ambient temperature of the vehicle. The electronic controller is programmed to control determine whether the ambient temperature is in an ambient temperature zone based on the detected result of the temperature detector. The ambient temperature zone includes a hot zone, a cold zone and a nominal zone. The electronic controller is programmed to control the airbag module between an active venting condition and a non-venting condition based on a detected result detected by the temperature detector. The vent is in an open state in the active venting condition. The vent is in a closed state in the non-venting condition.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
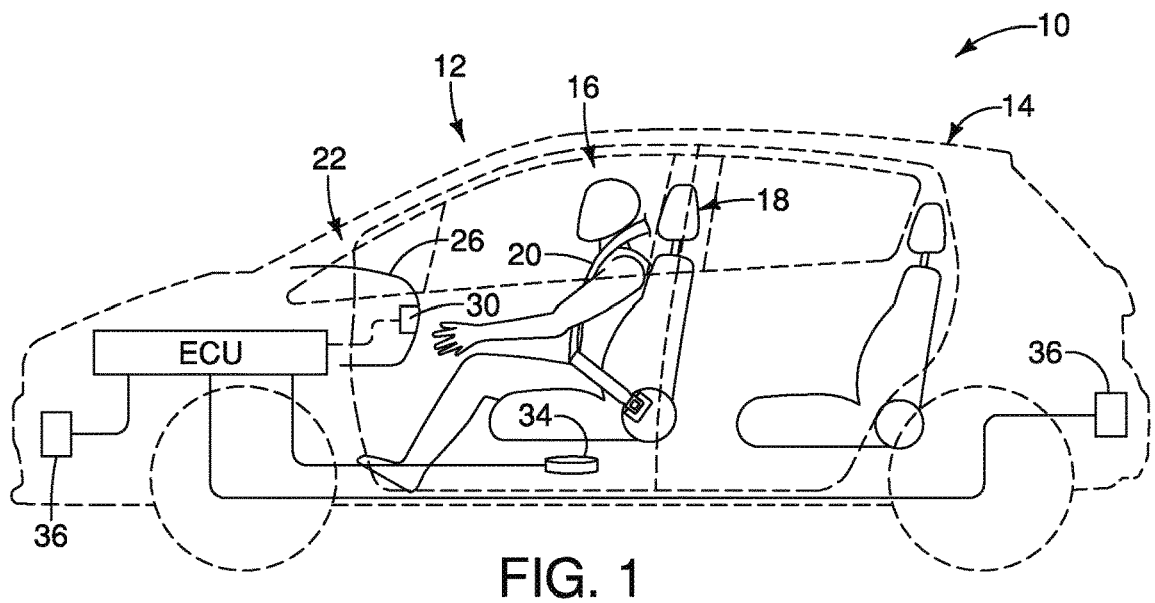
FIG. 1 is a schematic view of a vehicle equipped with a vehicle airbag control system in accordance with an illustrated embodiment.
Figure 2:
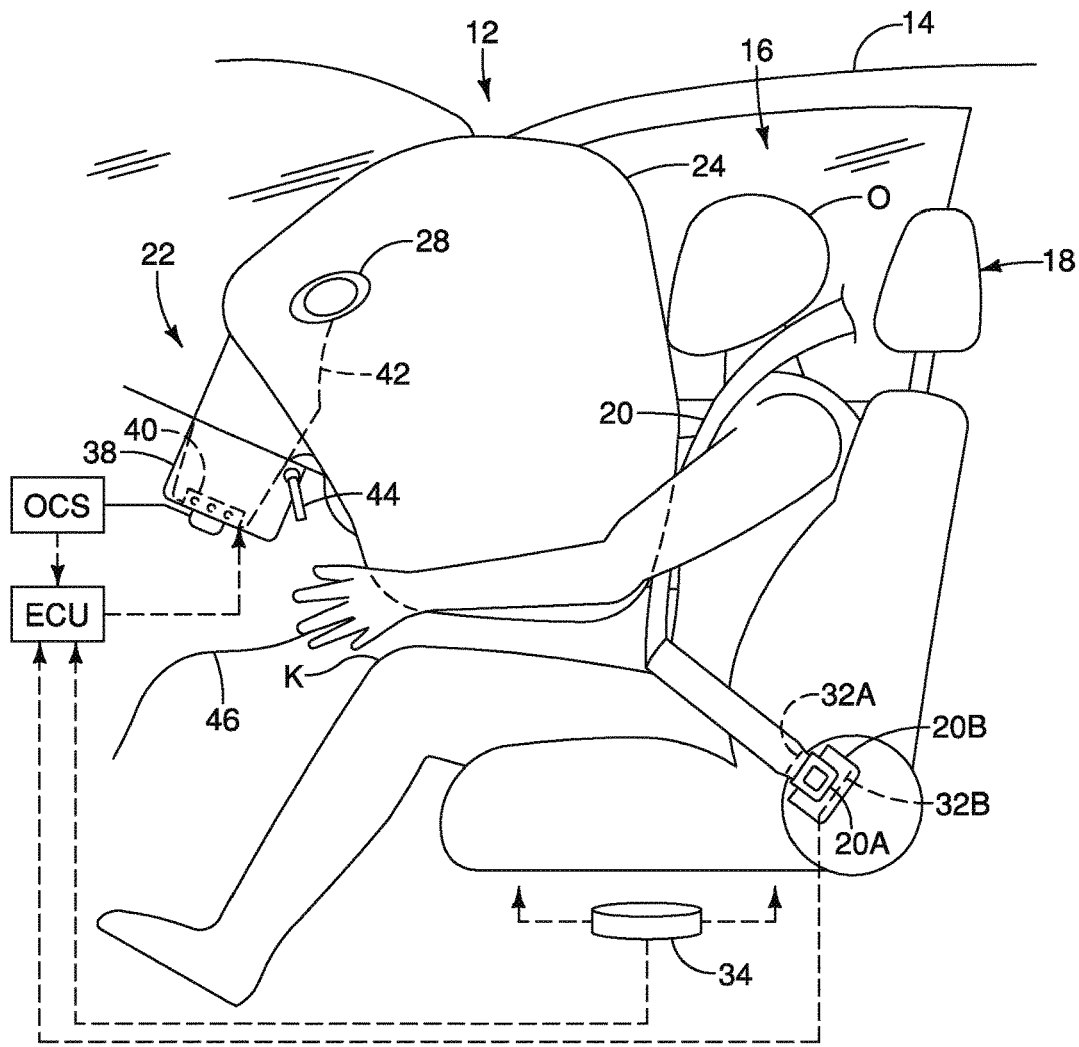
FIG. 2 is a side view of an interior of the vehicle in which an airbag of the vehicle airbag control system is in a deployed state.
Figure 3:
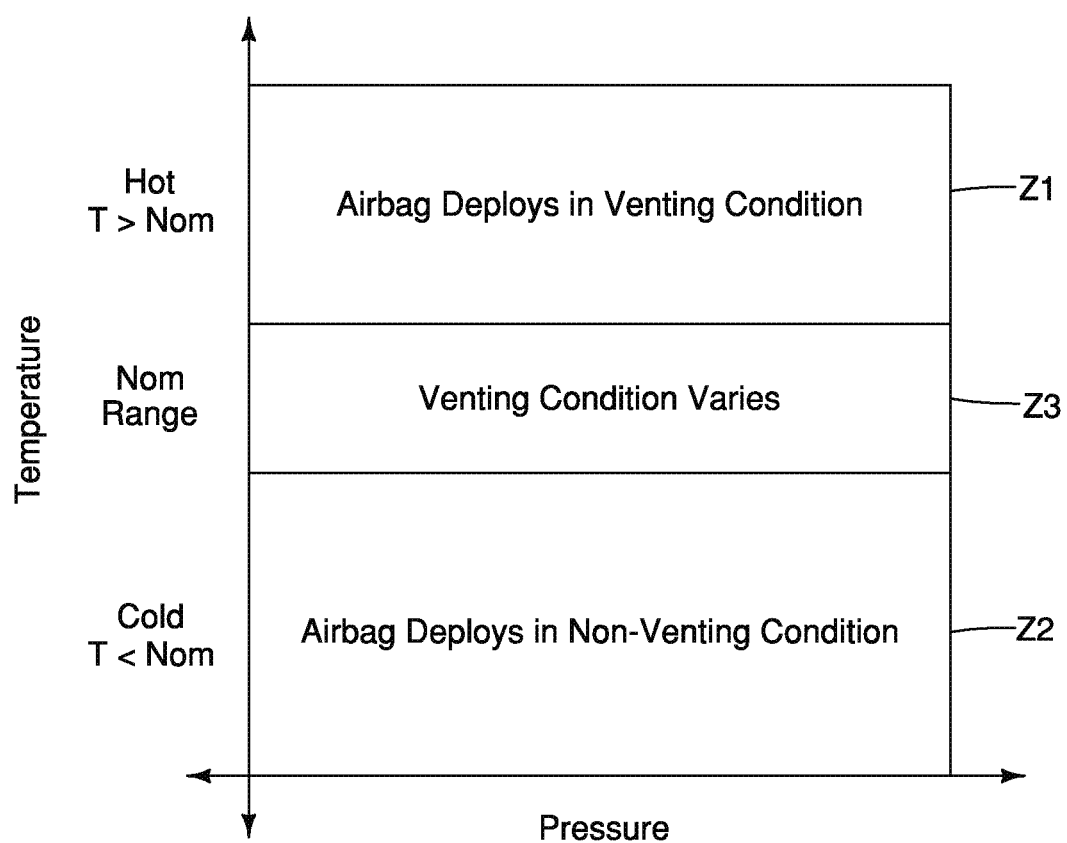
FIG. 3 is a schematic view of the ambient temperature zones stored in an electronic controller of the vehicle airbag control system.

Referring initially to FIG. 1, a vehicle 10 is illustrated as being equipped with a vehicle airbag control system 12. The vehicle 10 has a body structure 14 forming a passenger compartment 16 and a plurality of vehicle seats 18 (only one shown) within the passenger compartment 16. The vehicle seat 18 is equipped with a seatbelt 20 for restraining an occupant O in the vehicle seat 18 during an external impact to the vehicle 10, as shown in FIG. 2. The vehicle airbag control system 12 includes an airbag module 22 having an inflatable airbag 24 that is configured to be deployed from the vehicle's 10 instrument panel 26 (or dashboard). In the illustrated embodiment, the vehicle airbag module 22 is disposed in front of the vehicle seat 18. The airbag 24 has an active vent 28 that is movable between an open state and a closed state based on an ambient temperature of the vehicle 10. Because the ambient temperature of the vehicle 10 will affect an overall stiffness of the airbag 24 when the airbag 24 is deployed, the vehicle airbag control system 12 is provided to the vehicle 10 so that the airbag 24 is not too stiff or too soft based on the ambient temperature, as will be described below.

In the illustrated embodiment, the vehicle airbag control system 12 further comprises a detector 30 and an electronic controller (ECU). The detector 30 is a temperature detector 30 or sensor (hereinafter "temperature detector 30") that detects the ambient temperature of the vehicle. The ECU is further programmed to control the airbag module 22 between an active venting condition in which the vent 28 is in open state and a non-venting condition in which the vent 28 is in the closed state. The ECU controls the airbag module 22 between the active vent 28ing and the non-venting conditions based on the ambient temperature determined by the temperature detector 30. The ECU determines that the vehicle 10 is in a hot zone Z1, cold zone Z2 or a nominal temperature zone Z3 based on the ambient temperature that is detected.

Therefore, the ECU is programmed to control determine whether the ambient temperature is in a hot, cold or nominal temperature zone Z1, Z2 or Z3 based on the detected result of the temperature detector 30, as will be further discussed. In the illustrated embodiment, the ambient temperature zone includes three temperatures zones (i.e., the hot zone Z1, the cold zone Z2 and the nominal temperature zone Z3). However, it will be apparent to those skilled in the vehicle field from this disclosure that the ECU can be programmed to determine additional temperature zones or fewer temperature zones of the detected ambient temperature and to control the airbag module 22 accordingly.

As seen in FIG. 2, the vehicle airbag control system 12 further comprises a seatbelt detector 32 that is configured to detect whether the occupant O is wearing the seatbelt 20. The vehicle airbag control system 12 further comprises another detector that is an occupant detector 34 (hereinafter "occupant detector 34"). The occupant detector 34 is configured to detect a presence of an occupant O in the vehicle seat 18. As seen in FIG. 1, the vehicle airbag module 22 further comprises one or more impact detectors 36 that detect an external impact to the vehicle 10 above a predetermined threshold. The detectors 30, 32, 34 and 36 are in electrical communication with the ECU. That is, the detectors 30, 32, 34 and 36 are all electrically connected to the ECU to receive and send information to and from the ECU. The ECU controls the airbag module 22 to inflate the airbag 24 based on detection results from the detectors 30, 32, 34 and 36, as will be further discussed below.

Referring to FIG. 2, the airbag module 22 has a housing 38 with a generator 40 and the inflatable airbag 24. The generator 40 can include an ignitor and an inflator for deploying the airbag 24. In an undeployed state, the airbag 24 is packaged in the housing 38 which is mounted within the instrument panel 26. Alternatively speaking, the airbag 24 is packaged in the steering wheel of the vehicle 10. The airbag 24 is deployed from the instrument panel 26 to form a cushion for the occupant O upon a detected external impact to the vehicle 10. The housing 38 can be defined by a rigid container made of metal 32A and/or any other suitable material. The housing 38 is constructed to allow for fluid communication between the inflatable airbag and the generator 40. The generator 40 is activated by the ECU in response to predetermined vehicle conditions that are detected by the detectors 30, 32, 34 and 36.

As seen in FIG. 1, the airbag module 22 can be equipped with an occupant sensing system (OCS) that includes one or more sensors that are implemented in the housing 38. The OCS can be in direct electrical communication with the ECU. Alternatively, the OCS can be in direct electrical communication with the generator 40, and can directly actuate the generator 40.

As shown in FIG. 2, the airbag is equipped with the vent 28 that is configured to actively vent the airbag 24 as necessary. While the airbag 24 is shown as including one vent 28, it will be apparent to those skilled in the vehicle field from this disclosure that the airbag module 22 can include additional vents at various locations as needed and/or necessary. For example, the airbag can be equipped with a vent on each side, with only one side vent 28 being shown in the illustrated embodiment.

The airbag module 22 further includes one or more vent strap(s) 42 that is coupled to the vent 28 for operating the vent 28 to release inflated gas to the exterior of the airbag 24 upon the airbag's 24 deployment. The vent strap 42 can be made of cords of synthetic fibers. The vent strap 42 preferably has a length that is under tension when the airbag is deployed. The vent strap 42(s) is part of a strap release mechanism 44 of the airbag module 22. The release mechanism 44 controls the vent strap(s) 42 to allow for active venting of the vent 28 when the airbag 24 is deployed. The release mechanism 44 can include a strap cutter having a blade that is actuated by inflation gas from the generator 40. The vent strap 42 is coupled to the release mechanism 44 such that the release mechanism 44 cuts the vent strap 42 to enable the vent 28 to open. Therefore, the release mechanism 44 cuts the vent strap 42 so that the vent 28 is opened and in the airbag 24 is in the venting state.

The release mechanism 44 can alternatively be operated by a separate pyrotechnic or electric device. It will be apparent to those skilled in the vehicle field from this disclosure that various methods and techniques of coupling the vent strap 42 to the release device can be utilized, such as tying, gluing, and using hardware including one or more bolts, screws, pins, or bands. In this way, the vent 28 is movable between an active venting condition and a non-venting condition. In the active venting condition, the vent 28 is in an open state. In the non-venting condition, the vent 28 is in a closed state.

Referring to FIG. 1, the temperature detector 30 can be implemented as part of the heating, ventilation and air condition (HVAC) system of the vehicle 10. For example, the HVAC can have an automatic AC setting that will automatically set and regulate the ambient temperature of the vehicle continuously during vehicle 10 use. Therefore, the HVAC system can be set so that the temperature detector 30 continuously monitors the the ambient and cabin temperature in order to cycle the HVAC between ON and OFF conditions. The automatic setting can be integrated with the ECU such that the temperature detector 30 continuously detects the ambient temperature of the vehicle 10 when the vehicle 10 is in use.

As stated, the occupant detector 34 detects the presence of an occupant O within the vehicle 10. Preferably, the occupant detector 34 detects the presence of the occupant O in the vehicle seat 18 that corresponds to the airbag 24. Additionally, the occupant detector 34 can detect whether the occupant O is a child or an adult. For example, the occupant detector 34 can be a weight detector or seat scale that detects a weight exerted on the vehicle seat 18, as seen in FIG. 1. The occupant detector 34 can detect whether the occupant O is a child or an adult based on the detected weight. The occupant detector 34 can be one or more strain-gage load cells that are disposed along the vehicle seat's 18 rails or at other locations on the vehicle seat 18.

Alternatively, as seen in FIG. 2, the occupant detector 34 can be implemented with the OCS of the airbag module 22 inside of the housing 38. For example, the occupant detector 34 can alternatively be an in-vehicle camera that captures images of the passenger compartment 16 to determine the presence of an occupant O. The occupant detector 34 can also be an optical or infrared sensor disposed in the housing 38 of the airbag module 22 to detect the occupant's O approximate surface area and/or distance from the instrument panel 26 or other vehicle structures from where the airbag 24 is deployed. The ECU can control the airbag module 22 between the venting and non-venting conditions based on whether the occupant O is in the vehicle seat 18.

Referring to FIG. 2, the seatbelt detector 32 is configured to detect whether the occupant O is wearing the seatbelt 20. The seatbelt detector 32 can be a reed sensor that detects when a metal buckle 20A (i.e., a male portion) of the seatbelt 20 is inserted into a buckle housing 20B (i.e., a female portion) of the seatbelt 20. For example, as seen in FIG. 2, the seatbelt detector 32 can include a magnet 32A and a reed switch 32B. The magnet 32A can be implemented with the buckle 20A in a conventional manner. The reed switch 32B can be implemented with the female portion in a conventional manner. When the buckle 20A is coupled to the buckle housing 20B, the reed switch 32B is actuated.

Alternatively, the seatbelt detector 32 can be implemented with the OCS of the airbag module 22. For example, the seatbelt detector 32 can be the in-vehicle camera that captures images of the passenger compartment 16 to read the passenger's seating position and whether the occupant O is wearing the seatbelt 20. The in-vehicle camera can detect whether the occupant O is an adult or a child. Additionally, the seatbelt detector 32 can include a tension sensor in the seatbelt 20 that that can detect whether the occupant O is an adult or a child based on the tension or pressure of the seatbelt 20. The ECU can control the airbag module 22 between the active venting condition and the non-venting condition based on a detected result of the seatbelt detector 32.

As seen in FIG. 1, the impact detectors 36 are in communication with the ECU. The ECU controls the airbag module 22 to inflate the airbag 24 upon the impact detectors 36 detecting a predetermined external force to the vehicle 10. The vehicle airbag control system 12 preferably includes at least front, rear and side impact sensors as appropriate and or necessary related to vehicle airbag deployment. The impact detector 36 can also be disposed at the vehicle's doors. The impact detector 36 can alternatively or additionally include an accelerometer(s) that measures the magnitude of a negative acceleration experienced by the vehicle. For example, the impact detectors 36 can be motion detectors, inertia switches or accelerometers. The impact detectors 36 can alternatively be a vehicle camera(s) that captures images exterior to the vehicle 10 to detect an oncoming impact to the vehicle 10. Therefore, the vehicle 10 includes the impact detectors 36.

The airbag 24 deploys when the vehicle 10 receives an external impact above a threshold level. The generator 40 of the airbag module 22 receives an ignition signal from the ECU that activates the generator 40 to inflate pressurized gas into the airbag 24. Therefore, the ECU activates the generator 40 to the deploy the airbag upon the impact detector(s) 36 detecting the predetermined external force to the vehicle 10. For example, the ECU sends the ignition signal to activate the generator 40 upon the impact detector(s) 36 detecting the external impact to inflate the airbag 24.

The ECU of the vehicle airbag control system 12 is preferably a microcomputer that includes one or more processor and one or more storage device (i.e., a computer memory device). The term "ECU" as used herein refers to hardware that executes a software program, and does not include a human. The microcomputer is programmed with an airbag deployment control program that controls the deployment of the airbag 24. The storage device is any computer storage device or any computer readable medium with the sole exception of a transitory, propagating signal. For example, the memory can be nonvolatile memory and volatile memory, and can includes a ROM (Read Only Memory) device, a RAM (Random Access Memory) device, a hard disk, a flash drive, etc.

The storage device is configured to store settings, programs, data, calculations and/or results of the processor(s). For example, the storage device of the ECU can store the predetermined weight exerted on the vehicle seat 18 and/or the predetermined tension on the seatbelt 20 for deploying the airbag 24. The storage device can also store the predetermined external force that is to be determined by the impact detector(s) 36 that is necessary for deploying the airbag 24. The storage device can additionally store any template images for determining the presence of occupant O(s) in the vehicle 10.

In the illustrated embodiment, the storage device of the ECU further stores any preset temperature zones for determining the ambient temperature zone of the detected ambient temperature by the temperature detector 30. The storage device in particular stores the hot zone Z1, the cold zone Z2 and the nominal temperature zone Z3 of the vehicle 10. In the illustrated embodiment, the hot zone Z1 is a temperature zone in which the detected ambient temperature is preferably approximately ninety (90) degrees Fahrenheit or above.

The cold zone Z2 is a temperature zone in which the ambient temperature is preferably approximately 50 degrees Fahrenheit or below.

In other words, when the temperature detector 30 detects an ambient temperature of 90 degrees Fahrenheit or above, the microprocessor determines that the ambient temperature is in the hot zone Z1. When the temperature detector 30 detects an ambient temperature of fifty (50) degrees Fahrenheit or below, the microprocessor determines that the ambient temperature is in the cold zone Z2. In the illustrated embodiment, the ambient zone is preferably centered at approximately seventy (70) degrees Fahrenheit. It will be apparent to those skilled in the vehicle field from this disclosure that the ECU can be programmed to store different temperature zones as needed and/or desired.

The ECU is operatively coupled to the components of the airbag module 22 and the detectors in a conventional manner. In this way, the microcomputer of the ECU is programmed to control the airbag 24 based on detection results detected by the detectors 30, 32, 34 and 36. The ECU transmits an ignition signal to the generator 40 of the airbag module 22 to deploy the airbag 24. The ECU controls the airbag module 22 such that the vent 28 is in the open state when the ECU determines that the ambient temperature is in the hot zone Z1. The ECU controls the airbag module 22 such that the vent 28 is in the closed state when the ECU determines that the ambient temperature is in the cold zone Z2. The ECU controls the airbag module 22 between the active venting condition and the non-venting condition when the ECU determines that the ambient temperature is in the nominal temperature zone Z3 that is between the hot zone Z1 and the cold zone Z2.

Figure 4:
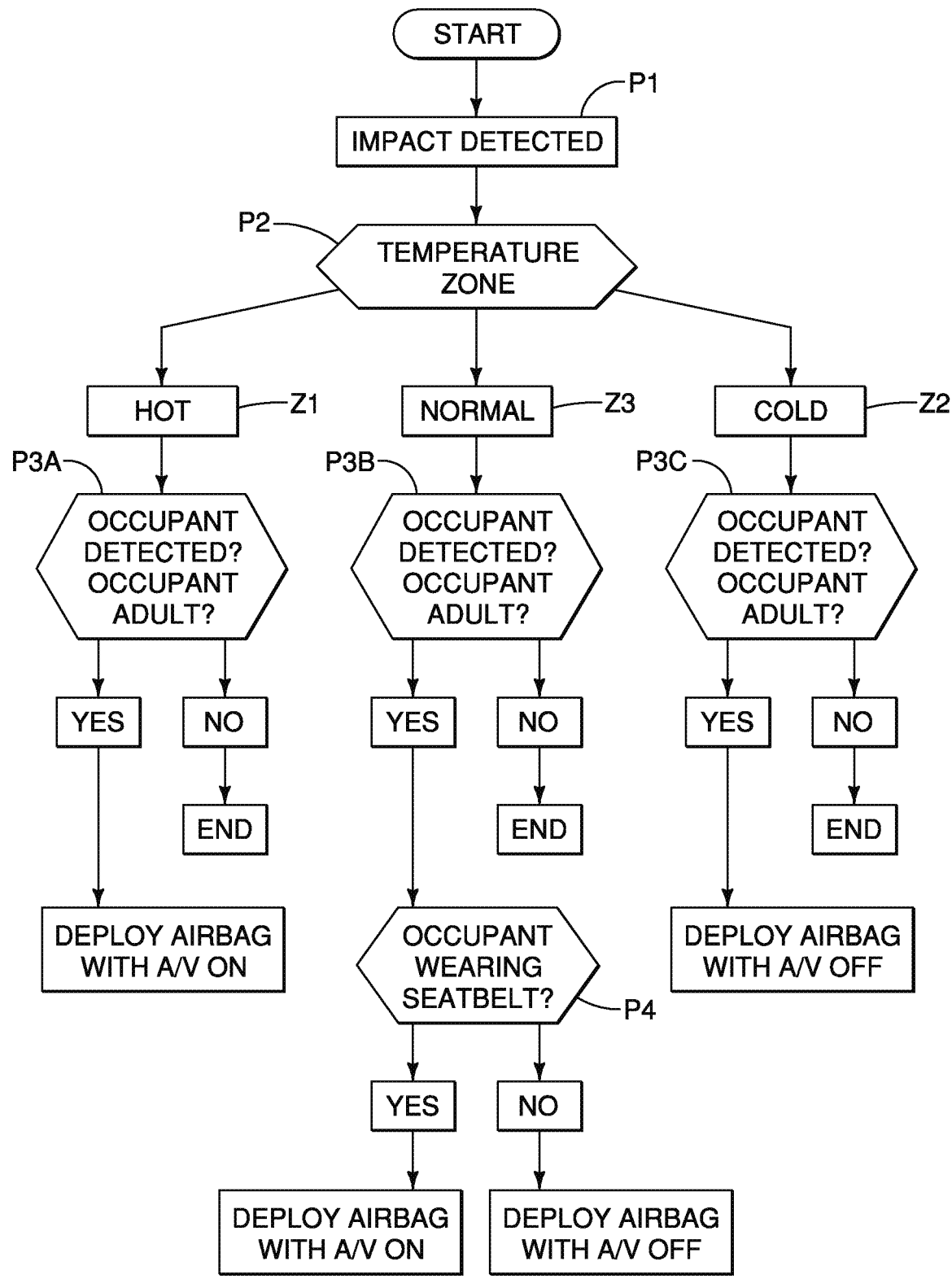
FIG. 4 is a flowchart showing an algorithm that is stored in the electronic controller of the vehicle airbag control system.

The storage device can store algorithm(s) for the microprocessor to determine whether or not to deploy the airbag 24 and whether to actuate the vent 28, such as the algorithm shown in FIG. 4. In step P1, the ECU will determine whether an external impact has been detected by any one of the impact detectors 36. If yes, the ECU will determine the ambient temperature zone based on the detected temperature from the temperature detector 30 in step P2. If the detected temperature is 90 degrees Fahrenheit or above, the ECU will determine that the ambient temperature is in the hot zone Z1. If the detected temperature is 50 degrees Fahrenheit or below, the ECU will determine that the ambient temperature is in the cold zone Z2. If the detected temperature is between 50 degrees Fahrenheit and 90 degrees Fahrenheit, the ECU will determine that the ambient temperature is in the nominal temperature zone Z3.

When the ambient temperature is in the hot zone Z1, the ECU will then determine whether there the vehicle seat 18 is occupied, and whether the occupant O is an adult or a child in step P3A. When the ECU determines that the occupant O is not present or that the occupant O is not an adult, then the process ends. When the ECU determines that the occupant O is present and is an adult, then the airbag 24 is deployed and the vent 28 is opened so that the airbag 24 is in the venting condition. Therefore, the airbag 24 is venting to counteract the airbag 24 from being too stiff caused by the ambient temperature being in the hot zone Z1.

When the ambient temperature is in the nominal temperature zone Z3, the ECU will then determine whether there the vehicle seat 18 is occupied, and whether the occupant O is an adult or a child in step P3B. When the ECU determines that the occupant O is not present or that the occupant O is not an adult, then the process ends. When the ECU determines that the occupant O is present and is an adult, then the ECU determines whether the occupant O is wearing the seatbelt 20 in step P4. When the ECU determines that the occupant O is wearing the seatbelt 20, the ECU controls the airbag module 22 to deploy the airbag 24 in the venting condition.

Therefore, the airbag 24 is deployed in the venting condition so that the airbag 24 is less stiff when the occupant O is wearing the seatbelt 20 and when the ambient temperature is in the nominal temperature zone Z3. In this way, the ECU controls the airbag module 22 such that the vent 28 is in the open state when the ECU determines that the occupant O is wearing the seatbelt 20 when the ambient temperature is in the nominal temperature zone Z3. The airbag 24 is deployed and the non-venting condition so that the airbag 24 has a normal stiffness when the occupant O is not wearing the seatbelt 20 and the ambient temperature is in the nominal temperature zone Z3. Therefore, the ECU controls the airbag module 22 such that the vent 28 is in the closed state when the ECU determines that the occupant O is not wearing the seatbelt 20 when the ambient temperature is in the nominal temperature zone Z3.

When the ambient temperature is in the cold zone Z2, the ECU will then determine whether there the vehicle seat 18 is occupied, and whether the occupant O is an adult or a child in step P3C. When the ECU determines that the occupant O is not present or that the occupant O is not an adult, then the process ends. When the ECU determines that the occupant O is present and is an adult, then the airbag 24 is deployed and the vent 28 is not actuated so that the airbag 24 is in the non-venting condition. Therefore, the airbag 24 is not venting so that the airbag 24 has a basic stiffness when the ambient temperature is in the cold zone Z2. In this way, the ECU is programmed to control the airbag module 22 between the active venting condition and the non-venting condition based on a detected result detected by the temperature detector 30.

It will also be apparent to those skilled in the vehicle field from this disclosure that the venting of the airbag 24 can be based on the detection results by the OCS and the seatbelt detector 32, occupant detector 34 and/or the impact detector 36 based on criteria other than temperature. For example, the ECU can control the airbag module 22 between the venting and non-venting conditions during deployment based on the seatbelt detector 32 and/or the occupant detector 34 detecting that the occupant is a larger adult or has a weight above a preset weight. The ECU can control the airbag module 22 between the venting and non-venting conditions during deployment based on the seatbelt detector 32 and/or the occupant detector 34 detecting that the occupant is a smaller adult or has a weight below a preset weight. Additionally, the ECU can control the airbag module 22 between the venting and non-venting conditions during deployment based on the impact detector 36 detecting a predetermined impact speed or direction. It will also be apparent to those skilled in the vehicle field from this disclosure that the venting of the airbag 24 can be based on other detected results by the OCS and the seatbelt detector 32, occupant detector 34 and/or the impact detector 36.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section." "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle equipped with the vehicle airbag control system. Accordingly, these terms, as utilized to describe the present invention should be interpreted relative to a vehicle equipped with the vehicle airbag control system.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle airbag control system, comprising:
   an airbag module for a vehicle, the airbag module having an airbag with a vent;
   a temperature detector configured to detect an ambient temperature of the vehicle; and
   an electronic controller programmed to control the airbag module between an active venting condition in which the vent is in an open state and a non-venting condition in which the vent is in a closed state based on a detected result detected by the temperature detector.

2. The vehicle airbag control system according to claim 1, wherein
   the electronic controller controls the airbag module such that the vent is in the open state when the electronic controller determines that the ambient temperature is in a hot zone.

3. The vehicle airbag control system according to claim 2, wherein
the hot zone is a temperature zone in which the ambient temperature is 90 degrees Fahrenheit or above.

4. The vehicle airbag control system according to claim 1, wherein
the electronic controller controls the airbag module such that the vent is in the closed state when the electronic controller determines that the ambient temperature is in a cold zone.

5. The vehicle airbag control system according to claim 4, wherein
the cold zone is a temperature zone in which the ambient temperature is 50 degrees Fahrenheit or below.

6. The vehicle airbag control system according to claim 2, wherein
the electronic controller controls the airbag module such that the vent is in the closed state when the electronic controller determines that the ambient temperature is in a cold zone.

7. The vehicle airbag control system according to claim 3, wherein
the electronic controller controls the airbag module such that the vent is in the closed state when the electronic controller determines that the ambient temperature is in a cold zone.

8. The vehicle airbag control system according to claim 7, wherein
the hot zone is a temperature zone in which the ambient temperature is 50 degrees Fahrenheit or below.

9. The vehicle airbag control system according to claim 1, further comprising
an occupant detector configured to detect a presence of an occupant of the vehicle, the electronic controller being programmed to control the airbag module between a deployed condition in which the airbag is inflated and a non-deployed condition in which the airbag is not inflated based on a detected result of the occupant detector.

10. The vehicle airbag control system according to claim 9, further comprising
a seatbelt detector configured to detect whether the occupant is wearing a seatbelt, the electronic controller being programmed to control the airbag module between the active venting condition and the non-venting condition based on a detected result of the seatbelt detector.

11. The vehicle airbag control system according to claim 6, further comprising
a seatbelt detector configured to detect whether the occupant is wearing a seatbelt, the electronic controller being programmed to control the airbag module between the active venting condition and the non-venting condition based on a detected result of the seatbelt detector.

12. The vehicle airbag control system according to claim 11, wherein
the electronic controller controls the airbag module between the active venting condition and the non-venting condition when the electronic controller determines that the ambient temperature is in a nominal zone that is between the hot zone and the cold zone.

13. The vehicle airbag control system according to claim 12, wherein
the electronic controller controls the airbag module such that the vent is in the open state when the electronic controller determines that the occupant is wearing the seatbelt when the ambient temperature is in the nominal zone.

14. The vehicle airbag control system according to claim 13, wherein
the electronic controller controls the airbag module such that the vent is in the closed state when the electronic controller determines that the occupant is not wearing the seatbelt when the ambient temperature is in the nominal zone.

15. The vehicle airbag control system according to claim 12, wherein
the ambient zone is centered at seventy degrees Fahrenheit.

16. A vehicle airbag control system, comprising:
an airbag module for a vehicle, the airbag module having an airbag with a vent;
a temperature detector configured to detect an ambient temperature of the vehicle; and
an electronic controller programmed to control determine whether the ambient temperature is in an ambient temperature zone based on the detected result of the temperature detector, the ambient temperature zone including a hot zone, a cold zone and a nominal zone,
the electronic controller being further programmed to control the airbag module between an active venting condition in which the vent is in an open state and a non-venting condition in which the vent is in a closed state based on the temperature zone determined by the electronic controller.

17. The vehicle airbag control system according to claim 16, wherein
the electronic controller controls the airbag module such that the vent is in the open state when the electronic controller determines that the temperature zone is in the hot zone.

18. The vehicle airbag control system according to claim 17, wherein
the electronic controller controls the airbag module such that the vent is in the closed state when the electronic controller determines that the ambient temperature zone is in the cold zone.

* * * * *